March 13, 1934.  G. E. MOLYNEUX  1,950,992
POWER TRANSMISSION DEVICE
Filed Sept. 25, 1931  5 Sheets-Sheet 3

INVENTOR
George E. Molyneux
BY
Redding, Greeley, O'Shea & Campbell
ATTORNEYS

March 13, 1934.   G. E. MOLYNEUX   1,950,992
POWER TRANSMISSION DEVICE
Filed Sept. 25, 1931   5 Sheets-Sheet 4

INVENTOR
George E. Molyneux
BY Redding, Greeley, O'Shea Campbell
ATTORNEYS

Patented Mar. 13, 1934

1,950,992

UNITED STATES PATENT OFFICE 1,950,992

POWER TRANSMISSION DEVICE

George E. Molyneux, Bayonne, N. J.

Application September 25, 1931, Serial No. 565,052

7 Claims. (Cl. 74—59)

This invention has been developed with particular reference to its application to motor vehicles, but its applicability to other uses, wherever it is desirable to control automatically the speed of transmission as between a driving member and a driven member, will be readily apparent. The main purpose of the invention is to enable the engagement of different transmission gears to be determined by the speed of the driving member, it being also possible to influence such engagement by the speed of the driven member. Incidentally to the attainment of the main purpose of the invention it has been sought also to provide effective means for carrying out the general purpose, which is accomplished through the use of overrunning clutches interposed at suitable points in the chain of gears, the effective engagement of each of such overrunning clutches being controlled by centrifugal action. The clutches are preferably of the roller type, in which the rollers tend normally to move into effective position, such tendency being supplemented by springs, the rollers being moved out of effective position by devices the operation of which is controlled by centrifugal bodies subjected to the speed of rotation of the rotating part to which they are related. In the particular embodiment of the invention chosen for explanation of its nature the centrifugal bodies, pivotally mounted on one rotating part, act upon a sliding ring which carries pins parallel with the axis of rotation and each in operative relation with one of the clutch rollers, the pin being armed with a cam tooth which coacts with a circumferential groove of the pin formed with inclined sides. The tooth bears normally upon one of the inclined sides of the groove, holding the roller out of effective position. As the centrifugal weight flies out under the influence of increased speed of rotation the cam tooth is first moved to a position which permits the roller to be moved by normal action supplemented, it may be, by spring action, into effective position, closing the clutch and permitting the transmission of power from one member of the clutch to the other. If the speed increases beyond a predetermined degree the cam tooth may be moved further in the same direction and thereby made to coact with the other inclined side of the groove of the clutch roller and thereby to cause the roller to be moved again out of effective engagement.

The invention will be more fully explained hereinafter with reference to the accompanying drawings, in which the chosen embodiment is illustrated, and in which.

Figure 1:
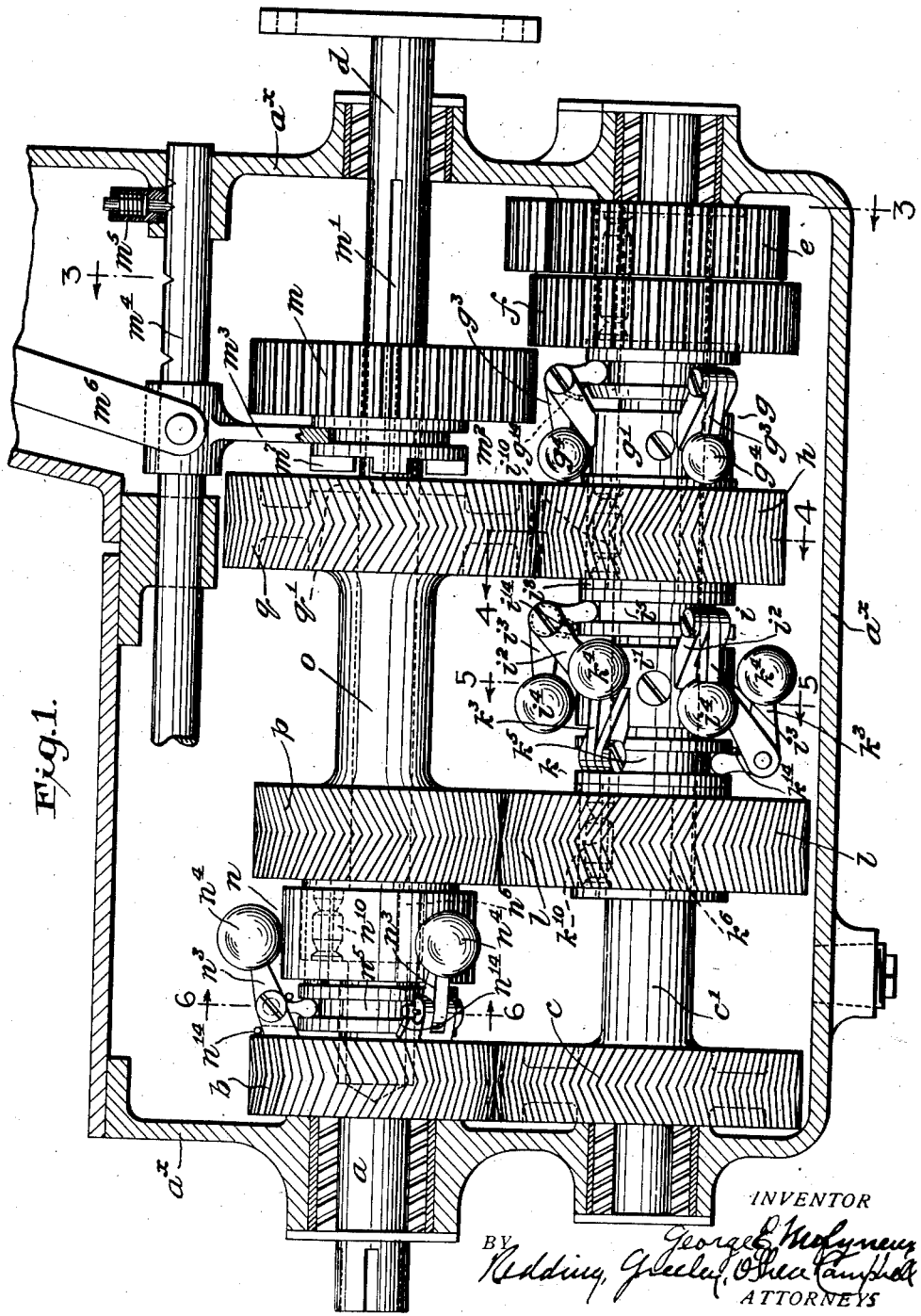
Figure 1 is a view in side elevation of the transmission mechanism, the housing being shown in section and, with a manual control lever, broken away.
Figure 4:
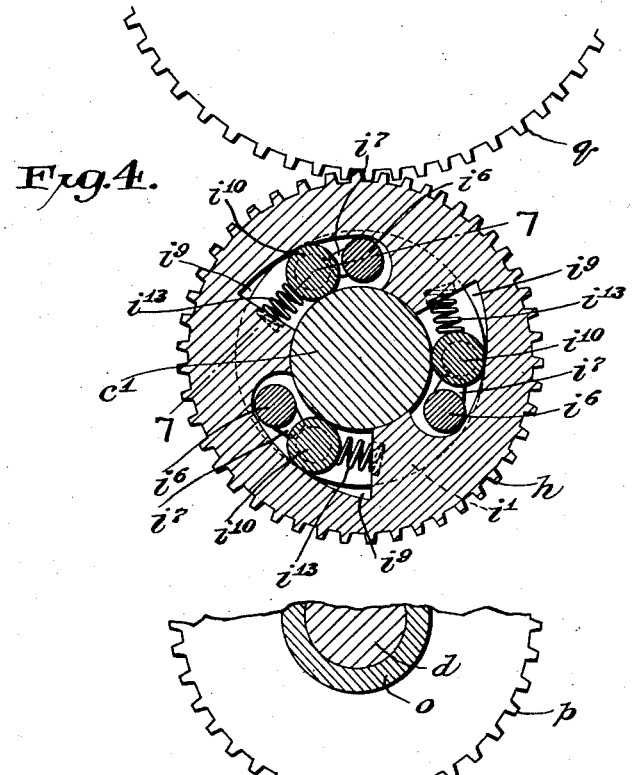
Figure 5:
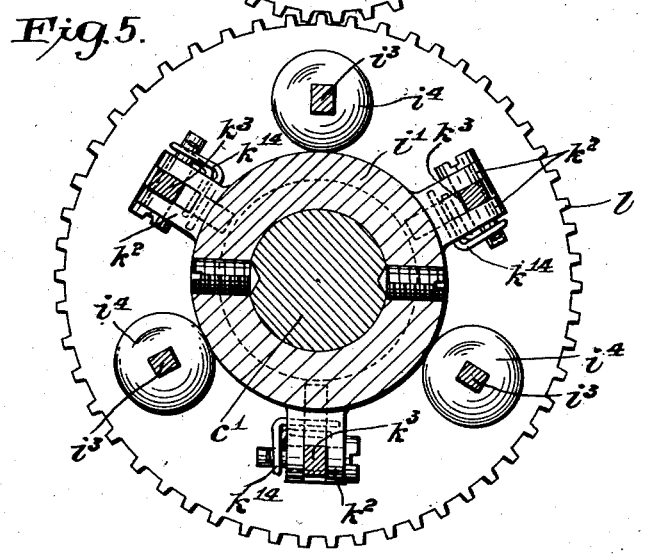
Figure 6:
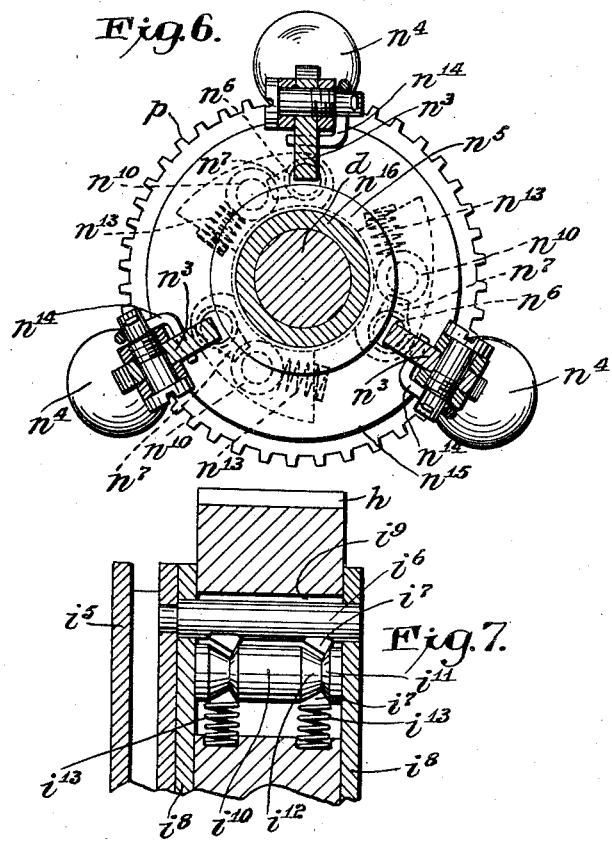

Figures 4, 5 and 6 are detail views in section respectively on the broken lines 4—4, 5—5 and 6—6 of Figure 1 and on a larger scale.

Figure 7:
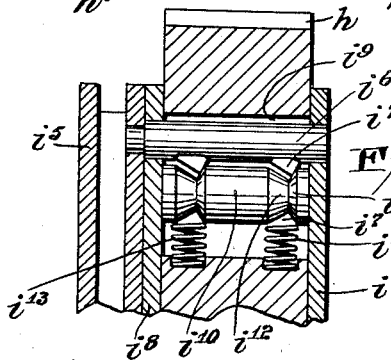
Figure 8:
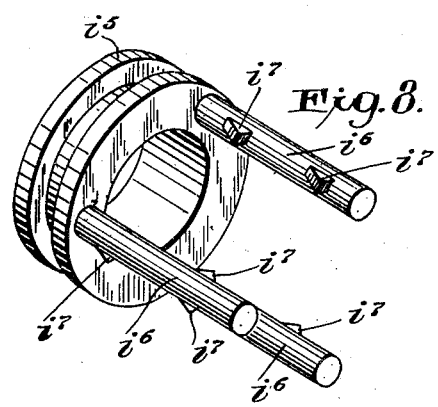

Figure 7 is a detail view in section on the plane indicated by the broken line 7—7 of Figure 4, and Figure 8 is a view in isometric perspective of one of the clutch rings and its pins.

In the embodiment of the invention illustrated in the drawings a shaft $a$, which may be coupled to a motor and may be taken as the driving member, is mounted in a suitable bearing in a housing $a^{\times}$ and may have secured thereto a gear $b$ which is preferably of the herringbone type and meshes with a corresponding gear $c$ on a jack shaft, mounted in suitable bearings in the housing. A shaft $d$ parallel with the shaft $c^1$ is shown as supported at one end in the gear $b$ and at the other end in a suitable bearing in the housing. It may be taken to be the driven member.

The shaft $c^1$ supports a reverse gear $e$, what may be termed an emergency gear $f$, an over-running or one-way clutch $g$, a slow speed gear $h$, a clutch $i$, a clutch $k$ and a second speed gear $l$.

The shaft $d$ supports a gear $m$ which is splined on the shaft, as indicated at $m^1$, so that it may be moved longitudinally on the shaft while remaining in rotative engagement therewith. The gear $m$ has a grooved hub $m^2$ engaged by a fork $m^3$ which is carried by a notched shaft $m^4$ engaged by a spring detent $m^5$ and operatively connected with a manual lever $m^6$ by which the gear $m$ can be moved into engagement either with the reverse gear or the emergency gear $f$ so that the shaft $d$ may be driven either from the reverse gear or from the emergency gear. As shown, both the reverse gear and the emergency gear are arranged at the same side of the gear $m$ but obviously they might be arranged one at one side and one at the other side of the same. The hub $m^2$ is also formed with clutch teeth, as at $m^7$, for engagement with a gear to be mentioned, so that the driven shaft $d$ may, at will, be driven from such gear.

Mounted on the shaft $d$ is a clutch $n$ and mounted loosely thereon is a sleeve $o$ which carries at one end a gear $p$, for engagement with the second speed gear $l$, and at the other end a gear $q$, for engagement with the low speed gear $h$, the hub of the gear $q$ being formed with clutch teeth $q'$ for coaction with the clutch teeth $m^7$ of the gear $m$. The several clutches $g$, $i$, $k$ and $n$, each being speed controlled, are similarly constructed and description of one will answer for each of the others, except for such differences as will be called to attention.

Figure 2:
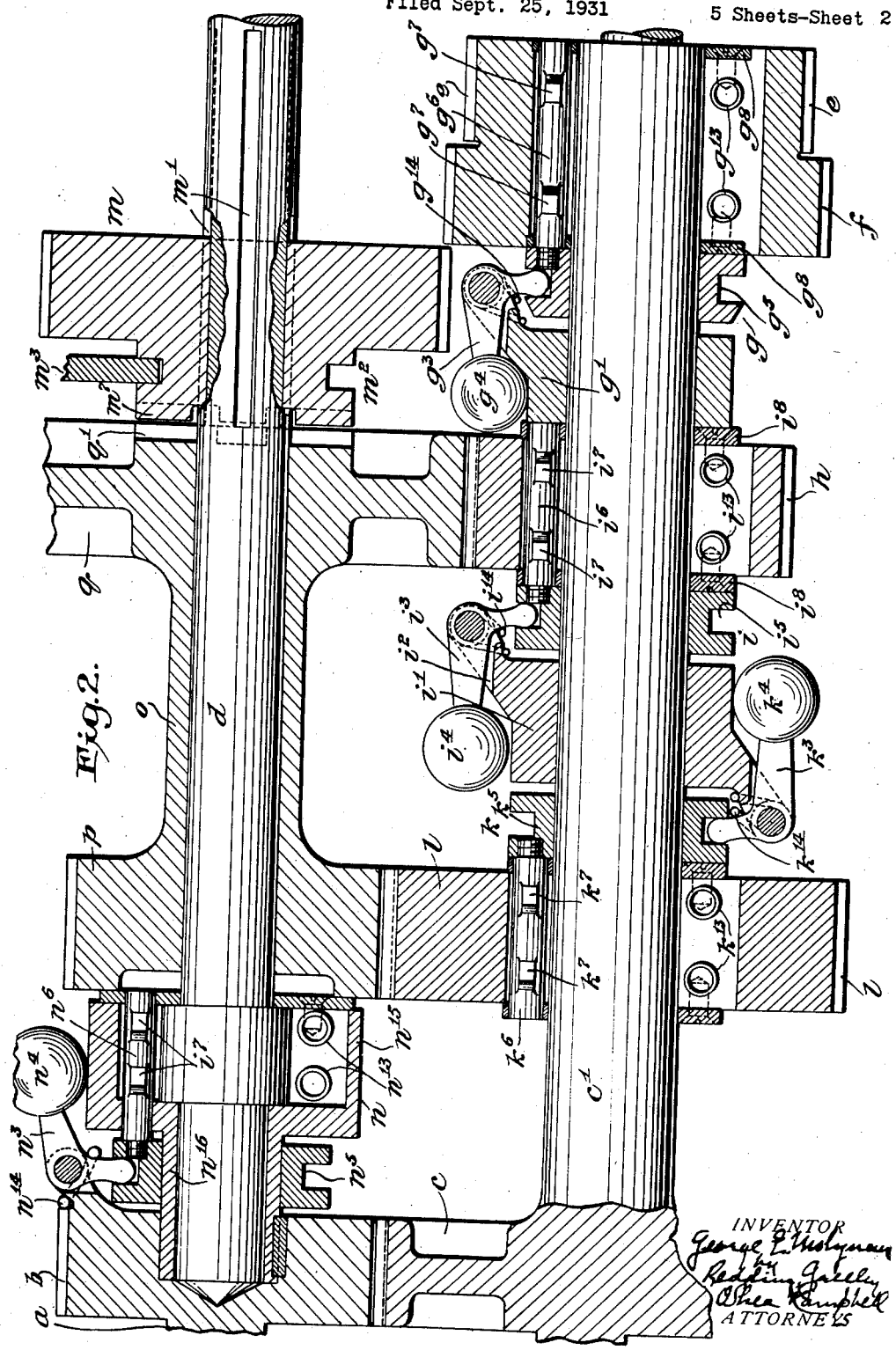
Figure 2 is a view of the same partly in side elevation and partly in longitudinal section, on a larger scale and broken away.
Figure 3:
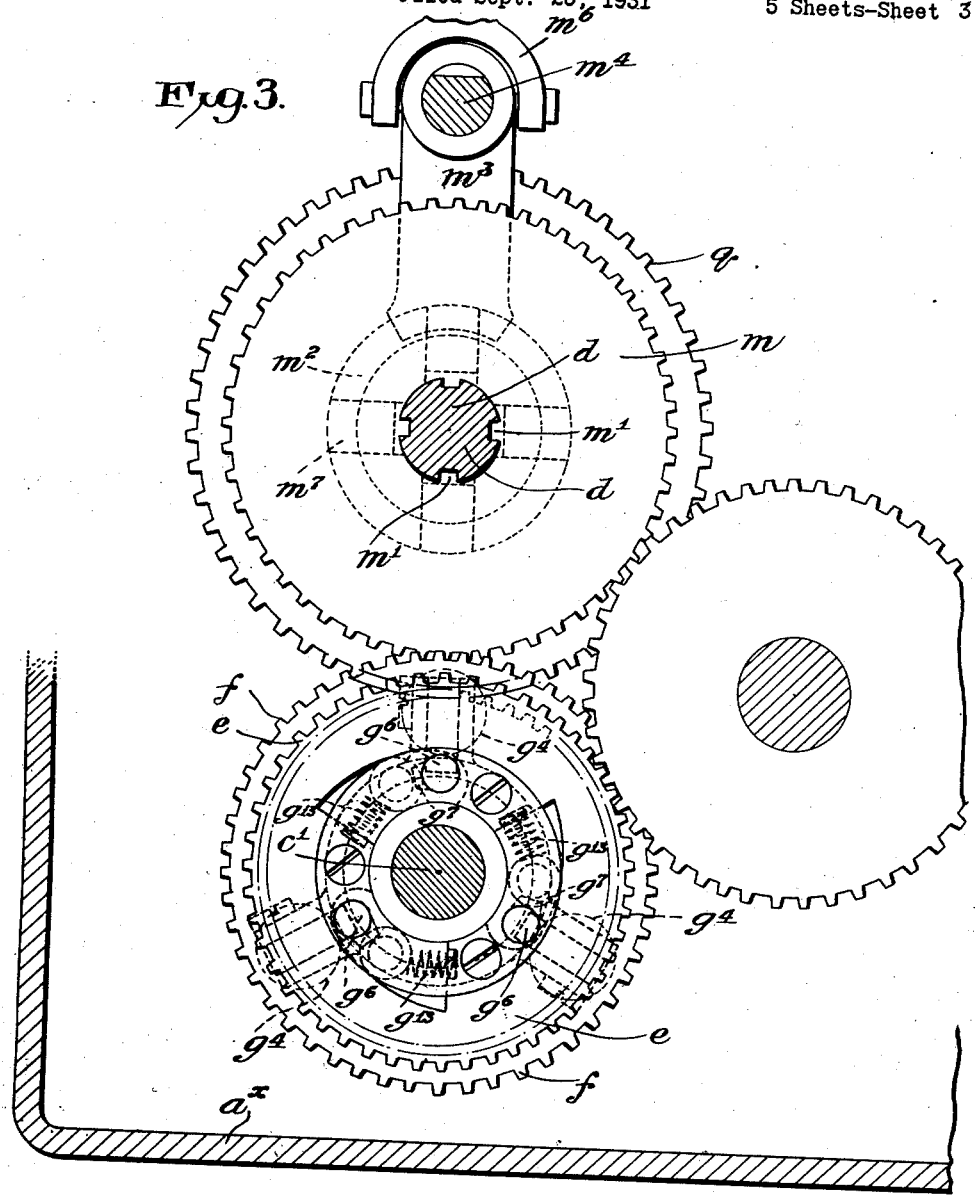
Figure 3 is a detail view in section on the plane indicated by the broken line 3—3 of Figure 1 and also on a larger scale.

Taking first the clutch $i$, the details of which are shown in Figures 1, 2, 4, 5, 7 and 8, it will be seen that there is secured on the shaft $c^1$ an annular block or ring $i^1$ in the arms $i^2$ of which are pivotally mounted bell-cranks $i^3$ the long arm of each of which carries a centrifugal weight $i^4$ while the shorter arm engages a peripherally grooved ring $i^5$ mounted loosely on the shaft $c^1$. The ring $i^5$ has secured to it, in parallelism with the shaft $c^1$, three pins $i^6$, each of which, in the construction shown, is armed with two cam teeth $i^7$. The pins $i^6$ are held in parallelism, in spaced relation, by plates $i^8$ which, as indicated by dotted lines in Figure 2, are secured, at opposite sides, to the body of the gear $h$, which is formed with tapered recesses $i^9$ to receive the clutch rollers $i^{10}$. Each clutch roller $i^{10}$ is formed with a circumferential groove between oppositely inclined side walls $i^{11}$, $i^{12}$. In the normal operation of such a clutch the rollers $i^{10}$ tend to move into the shallower portions of the recesses $i^9$ and to effect engagement between the outer walls of these recesses and the periphery of the shaft $c^1$. Such a normal tendency is preferably supplemented by springs $i^{13}$. It will be observed that a spring $i^{14}$ is applied to each bell-crank $i^3$ to hold the centrifugal body toward the ring or block $i^1$ against centrifugal action and it will be observed further that the corresponding springs of the several clutches $g$, $i$, $k$ and $n$ are increasingly heavier in the order named so that, as the speed of the driving member $a$ is increased from idling speed, the clutch $i$ shall first become effective and each of the other clutches $k$ and $n$ shall thereafter become effective in succession as the speed of the driving member is further increased. It will also be noted here that as each successive clutch becomes effective the clutch of each lower speed and of all lower speeds becomes ineffective by reason of the centrifugal action assisted by the overrunning of the clutch of lower speed as the clutch of next higher speed becomes effective.

The clutch $g$ comprises an annular block $g^1$ fixed to the shaft $c^1$, bell-crank levers $g^3$ with their centrifugal bodies $g^4$, springs $g^{14}$, grooved collar $g^5$, pins $g^6$ with cam teeth $g^7$, spacing plates $g^8$ and springs $g^{13}$.

The block or ring $i^1$ of the shaft $c^1$, common to the clutch $i$ and the clutch $k$, supports the bell-crank levers $k^3$ with their weights $k^4$ and springs $k^{14}$. The grooved ring $k^5$ engaged by the bell-crank levers $k^3$ carries the pins $k^6$ which are armed with cam teeth $k^7$ to coact with the rollers $k^{10}$, one of which is shown in dotted lines in Figure 1. The rollers $k^{10}$ are adapted to effect driving engagement between the shaft $c^1$ and the gear $l$ and to effect disengagement therebetween.

The clutch $n$ which is adapted to effect driving engagement between the driving member $a$, with its gear $b$, and the driven shaft $d$, comprises, similarly, bell-crank levers $n^3$ which are pivotally mounted on the gear $b$, weights $n^4$, springs $n^{14}$, grooved ring $n^5$ and pins $n^6$ with their cam teeth $n^7$. The grooved rollers $n^{10}$, shown in broken lines in Figures 1 and 6, are acted upon by springs $n^{13}$ and are adapted to effect driving engagement between the driven shaft $d$ and a sleeve $n^{15}$, the hub $n^{16}$ of which is fixed in the gear $b$ and supports the grooved ring $n^5$.

It will now be understood that when the motor is turning at idling speed all of the clutches are open and no power is transmitted from the driving member to the driven member. If the clutch $m^7$, $q^1$ is closed under manual control and the speed of the motor is increased the resistance offered by the comparatively weak springs $i^{14}$ permits the clutch $i$ to be closed and power to be transmitted from the driving shaft $a$ through the gears $b$ and $c$, the shaft $c^1$, the clutch $i$, the gears $h$ and $q$, the clutch $m^7$, $q^1$ and the splined gear $m$ to the driven shaft $d$. If the speed of the motor is further increased power is transmitted from the shaft $a$ through the gears $b$, $c$, the shaft $c^1$, the clutch $k$, gears $l$, $p$, the clutch $m^7$, $q^1$ and the gear $m$ to the driven shaft $d$ at second speed. If the speed of the motor be still further increased power is transmitted from the shaft $a$ through the sleeve member $n^{15}$ and $n^{16}$ and the clutch $n$ direct to the driven shaft $d$ at a 1:1 speed ratio. If it should be desired to transmit power at a high ratio or in reverse, the gear $m$ is shifted under manual control into engagement with the emergency gear or with the reverse gear and the power is then transmitted from the driving member $a$ through the gears $b$, $c$, the shaft $c^1$, the clutch $g$ and the emergency gear $f$ or the reverse gear $e$, as the case may be, to the gear $m$, and the driven shaft.

If the load should be increased during operation, as when a car moves from a level road, with the high speed gears in engagement, to a hill, the effect will be to slow down the car which will cause the disengagement of the high speed clutch and engagement of a lower speed clutch and a corresponding increase in the torque.

If at any time the operator takes his foot from the accelerator the motor will at once slow down and all clutches will open. If it is then desired to utilize the braking power of the motor the brake is first applied to slow down the car and the motor is then speeded up slightly to effect engagement of one or another of the clutches, thus enabling the braking power of the motor to be utilized. It will be obvious that if it is desired to make use of the emergency gear, or of the reverse gear the gears $e$, $f$, then rotating at idling speed, and the gear $m$ is then moved into engagement with the emergency gear or the reverse gear, as the case may be. It is essential to the accomplishment of applicant's purposes that the clutches be overrunning clutches, that is to say, that each clutch shall be of such a character that it is effective only in one direction of rotation and as determined by the centrifugal action developed by a predetermined speed and that except at that predetermined speed it shall not effect operative engagement. Only one clutch must be in operative engagement at one and the same time and all of the other clutches must be free running when the one clutch is in engagement.

It will be understood that various changes in details of construction and arrangement can be made to suit different conditions of use and that, except as pointed out in the accompanying claims the invention is not restricted to the particular construction shown and described herein.

I claim as my invention:

1. In a power transmission device the combination of a driving member, a driven member, an overrunning clutch operative in one direction of rotation only interposed between said members, and speed actuated means acting directly on said clutch to control the engagement of the clutch, said means including a device whereby said means in its initial movement causes the clutch to effect driving engagement and whereby said means in its further movement disengages the clutch.

2. In a power transmission device, the combination of a driving member, a driven member, an overrunning clutch operative in one direction of rotation only interposed between said members and comprising clutch rollers between the members of the clutch, speed actuated means acting directly on said clutch to move the rollers into and out of effective engagement with the clutch members, and springs independent of said means and cooperating with the rollers to effect engagement with the clutch.

3. In a power transmission device, the combination of a driving member, a driven member, an overrunning clutch operative in one direction of rotation only interposed between said members, means acting directly on said clutch to control the engagement of the clutch, and centrifugal bodies carried with one of said members and in operative relation with said means, said means including a device whereby said means in its initial movement in one direction causes the clutch to effect driving engagement and whereby said means in its further movement disengages the clutch.

4. In a power transmission device, the combination of a driving member, a driven member, an overrunning clutch operative in one direction of rotation only interposed between said members and including movable clutch bodies, a ring mounted movably with respect to the clutch, devices movable with the rings first to permit the clutch to effect driving engagement and in further movement to disengage the clutch, and centrifugal bodies carried with one of said members and operatively connected with said ring.

5. In a power transmission device, the combination of a driving member, a driven member, an overrunning clutch interposed between said members and comprising grooved clutch rollers between the members of the clutch, a ring movably mounted coaxially with the clutch, pins carried by said ring and having cam teeth for coaction with the grooved rollers, and centrifugal bodies carried with one of said members and operatively connected with said ring.

6. In a power transmission device, the combination of a plurality of sets of speed changing gears, overrunning clutches in operative relation with said sets of gears respectively, speed actuated means acting directly on said clutch to control the engagement of the clutches, and devices to offer yielding resistance to said speed actuated means, said devices successively offering increased resistance, whereby each clutch becomes effective at a different speed.

7. In a power transmission device, the combination of a plurality of sets of speed changing gears, overrunning clutches in operative relation with said sets of gears respectively, speed actuated means acting directly on said clutch to control the engagement of the clutches, and springs to offer yielding resistance to said speed actuated means, said springs successively offering increased resistance, whereby each clutch becomes effective at a different speed.

GEORGE E. MOLYNEUX.